T. E. MURRAY.
METHOD OF ELECTRICAL WELDING.
APPLICATION FILED JAN. 10, 1917.

1,252,142.

Patented Jan. 1, 1918.

INVENTOR
Thomas E. Murray
BY Park Benjamin
his ATTORNEY

UNITED STATES PATENT OFFICE.

THOMAS E. MURRAY, OF NEW YORK, N. Y.

METHOD OF ELECTRICAL WELDING.

1,252,142.　　　　Specification of Letters Patent.　　Patented Jan. 1, 1918.

Application filed January 10, 1917. Serial No. 141,543.

*To all whom it may concern:*

Be it known that I, THOMAS E. MURRAY, a citizen of the United States, residing at New York, in the county of New York and State of New York, have invented a certain new and useful Improvement in Methods of Electrical Welding, of which the following is a specification.

The invention is a method of electrical welding, whereby I am enabled to unite two bodies, each having normally a flat welding face, all points of which lie in the same plane, without extrusion of the metal at the welded joint, and without any modification or change in shape or configuration of the faces to be welded together, except such as is produced, as hereinafter described, by the formation of a cavity, or cavities, in one of said flat faces, and without the intervention between said faces of any extraneous body, or bodies, of metal to be fused and so serve as uniting material at the joint.

In the accompanying drawings—

Figure 1:
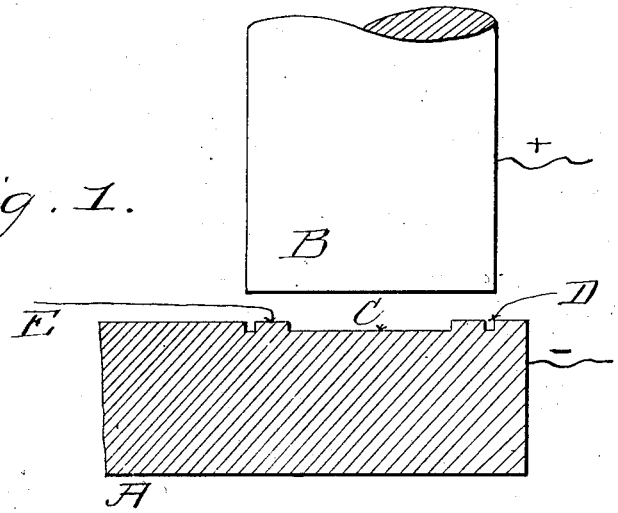
Figure 2:
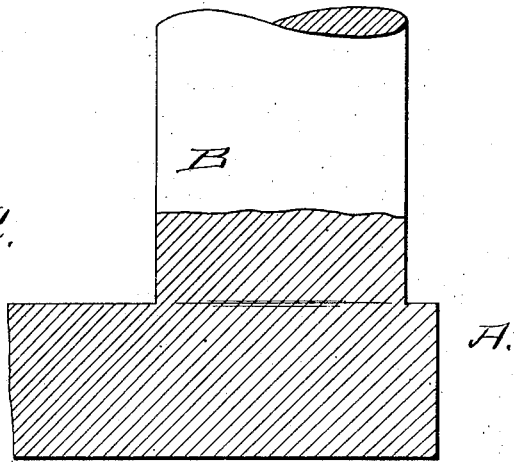

Figure 1 shows one of the two bodies to be welded in section, and the other of said bodies in elevation. Fig. 2 shows the united bodies in section.

Similar letters of reference indicate like parts.

A is one of the bodies to be electrically welded—here a plate or block of metal. B is the other of said bodies—here a rod to be butt welded to block A. Normally each body has a flat welding face, all points of which lie in the same plane. In the flat face of block A, I form a recess which may be either a single cavity, as shown at C, or a cavity as C surrounded by an annular groove D, so that a rib E of metal is thus produced between said cavity and said groove. The area of the welding face of rod B is to be sufficient to cover the cavity C, or both the cavity C and the groove D, if said groove be present, and as shown in Fig. 1. When the face of rod B is brought into contact with block A, and the welding current is established, the metal at the joint is rendered sufficiently plastic to flow into the cavity C, or into the cavity C and groove D, to fill the same and become trapped therein, substantially as shown in Fig. 2, the block and rod being pressed together in the usual way. The trapped metal is thus prevented from extruding around the joint.

The object of the groove D is to produce a rib E in which the welding current is concentrated, and the metal to be trapped thus rendered more quickly fluid.

I claim:

1. The method of electrically welding two bodies, each body having a normally flat welding face, all points of said face lying in the same plane, which consists in forming in one of said faces a recess, bringing the flat face of the other of said bodies into contact with said recessed face to cover said recess, and establishing the welding current; whereby the molten metal at the joint is caused to flow into and fill said recess.

2. The method of electrically welding two bodies, each body having a normally flat welding face, all points of said face lying in the same plane, which consists in forming in one of said faces a recess and an annular groove surrounding said recess, bringing the flat face of the other of said bodies into contact with said recessed and grooved face to cover said recess and groove, and establishing the welding current; whereby the molten metal at the joint is caused to flow into and fill said recess and groove.

3. The method of electrically welding two bodies, which consists in forming in a face of one of said bodies a cup-shaped cavity, bringing the face of the other of said bodies into contact with the face of said first-named body surrounding said cup-shaped cavity, and establishing the welding current; whereby the molten metal at the joint is caused to flow into and fill said cavity.

4. The method of electrically welding two bodies, as in claim 3, the face of the body containing the cup-shaped cavity having also an annular groove surrounding said cavity, which groove and cavity are both covered by the face of the opposite body; whereby the molten metal at the joint due to said welding current is caused to flow into and fill said cup-shaped cavity and surrounding groove.

In testimony whereof I have affixed my signature in presence of two witnesses.

THOMAS E. MURRAY.

Witnesses:
　　GERTRUDE T. PORTER,
　　MAY T. McGARRY.